United States Patent [19]

Staib et al.

[11] 3,980,623

[45] Sept. 14, 1976

[54] PROCESS FOR ETHYLENE-PROPYLENE-DIENE TERPOLYMERS USING VCl₄ AS CATALYST AND AS COCATALYST (1) R₃Al AND (2) RAlCl₂ IN ADMIXTURE

[75] Inventors: John H. Staib, Plainfield; Joseph Wagensommer, Westfield, both of N.J.

[73] Assignee: Exxon Research and Engineering Company, Linden, N.J.

[22] Filed: Aug. 2, 1974

[21] Appl. No.: 494,021

[52] U.S. Cl. ............................. 526/154; 526/157; 526/169; 526/336; 526/350
[51] Int. Cl.² .................................. C08F 210/18
[58] Field of Search ............... 260/80.78; 450/671.5

[56] References Cited
UNITED STATES PATENTS

| | | | |
|---|---|---|---|
| 3,205,216 | 9/1965 | McManimie et al. | 260/80.76 |
| 3,478,002 | 11/1969 | Nakaguchi et al. | 260/80.78 |
| 3,803,113 | 4/1974 | Gluntz et al. | 260/80.78 |

FOREIGN PATENTS OR APPLICATIONS

| | | | |
|---|---|---|---|
| 885,522 | 11/1971 | Canada | 260/80.78 |
| 680,483 | 2/1964 | Canada | 260/80.78 |
| 909,461 | 10/1962 | United Kingdom | |

*Primary Examiner*—Joseph L. Schofer
*Assistant Examiner*—Maria S. Tungol
*Attorney, Agent, or Firm*—A. Lagani; John J. Mahon

[57] ABSTRACT

This invention is directed to a process for preparing copolymers of ethylene with certain alpha olefins and nonconjugated dienes. The novel aspect of this invention relates to a catalyst system comprising a vanadium tetrachloride catalyst in conjunction with a cocatalyst comprising equimolar quantities of ethyl aluminum dichloride and tri-isobutyl aluminum. Isobutyl aluminum dichloride may be substituted for the ethyl aluminum dichloride. The product prepared by this process has a high number average molecular weight and is high in tensile strength when compounded with carbon blacks or mineral fillers and extender oils. Additionally, the polymer of this invention exhibits a rapid cure rate. Since the product further exhibits a narrow molecular weight distribution and low crystallinity, there is a greatly reduced die swell upon extrusion. The combination of the high molecular weight, narrow molecular weight distribution and low crystallinity produce a vulcanized product of low compression set.

11 Claims, No Drawings

PROCESS FOR ETHYLENE-PROPYLENE-DIENE TERPOLYMERS USING VCL$_4$ AS CATALYST AND AS COCATALYST (1) R$_3$AL AND (2) RALCL$_2$ IN ADMIXTURE

BACKGROUND OF THE INVENTION

This invention relates to a process for preparing polymeric compositions. More specifically, it relates to a novel process for producing polymers particularly characterized by their improved properties.

As is well known to those skilled in the art, copolymers of ethylene and higher alpha olefins such as propylene with other polymerizable monomers have been prepared. Typical of these other monomers may be non-conjugated dienes such as 1,4-hexadiene or 5-ethylidene-2-norbornene. It has, however, been found that many prior art polymers so prepared have been characterized by low rates of extrusion and have tensile strengths which have not been as high as desired.

It is an object of this invention to provide a process for preparing a copolymer of ethylene, a higher alpha olefin, and preferably a non-conjugated alkadiene. It is another object of this invention to provide a polymer characterized by improved properties. Other objects will be apparent to those skilled in the art on inspection of the following description.

SUMMARY OF THE INVENTION

An improved process for preparing an EPDM has now been found which comprises using as the catalyst system vanadium tetrachloride in conjunction with a cocatalyst comprising equimolar ratios of alkyl aluminum dichloride and tri-isobutyl aluminum wherein the alkyl aluminum dichloride is ethyl aluminum dichloride or isobutyl aluminum dichloride. The catalyst system may be introduced into the reaction medium either neat or dissolved in a suitable solvent. The aluminum to vanadium ratio is about 2:1 to about 20:1.

The products produced by this improved process are characterized by having high number average molecular weight, narrow molecular weight distribution and low crystallinity. As a result, when compounded with carbon black and extender oil, they exhibit high tensile strength and low compression set in the vulcanized state. These properties make the product of this invention useful in an oil extended rubber when polymerized to higher molecular weights.

DETAILED DESCRIPTION OF THE INVENTION

This invention relates to an improved process for preparing ethylene copolymers. Specifically, it relates to an improved catalyst system for the copolymerization of ethylene with alpha olefins and a nonconjugated diene. More specifically, the improved process comprises the use of a catalyst system comprising vanadium tetrachloride in conjunction with an equimolar ratio of an alkyl aluminum dihalide and tri-isobutyl aluminum as a cocatalyst.

The ethylene used in the practice of this invention is purified, commercially available ethylene of at least 99.98% purity. The ethylene may contain not more than 0.02% of nonolefinic impurities; more preferably less than 0.01%; most preferably less than 0.001% nonolefinic impurities. The alpha olefins useful in the practice of this invention are C$_3$-C$_{10}$ alpha olefins having a purity of greater than 99.98%. Similarly, such alpha olefins may contain not more than 0.02% of nonolefinic impurities; more preferably not greater than 0.01% nonolefinic impurities; most preferably not greater than 0.001% of such nonolefinic impurities. Additionally, the ethylene and alpha olefins should not contain more than 0.001% water, more preferably less than 0.0005% water; most preferably not more than 0.001% water.

The C$_3$-C$_{10}$ alpha olefins useful in the practice of this invention may be designated by the formula R-CH=CH$_2$, wherein R is a hydrocarbon radical having from 1 to 8 carbon atoms. The hydrocarbon radical may be alkyl or cycloalkyl. Illustrative examples of these C$_3$-C$_{10}$ alpha olefins are propene, butene-1, pentene-1, 3-methyl butene-1, hexene-1, 3-methyl pentene-1, 4-methyl pentene-1, heptene-1, 3-methyl hexene-1, 4-methyl hexene-1, 5-methyl hexene-1, 3-ethyl pentene-1, octene-1, 3-methyl heptene-1, 4-methyl heptene-1, 5-methyl heptene-1, 6-methyl heptene-1, 3-ethyl hexene-1, 4-ethyl hexene-1, 3-propyl hexene-1, and decene-1. The alpha olefin of choice is propylene.

The nonconjugated diolefins which may be used in conjunction with ethylene and the alpha olefins of this invention to prepare ethylene-alpha olefin-diene terpolymers are those nonconjugated diolefins having about 5 to about 14 carbon atoms. Illustrative examples of these non-conjugated diolefins are straight chain acyclic dienes such as 1,4-hexadiene and 1,6-octadiene. Illustrative of the preferred nonconjugated diene monomers are branched chain acyclic dienes such as 5-methyl 1,4-hexadiene; 3,7-dimethyl, 1,6-octadiene; 3,7-dimethyl 1,7-octadiene; and the mixed isomers of dihydromyrcene and dihydro-ocimene; single ring alicyclic dienes such as 1,4-cyclohexadiene; 1,5-cyclooctadiene; and 1,5-cyclododecadiene; multi-ring alicyclic fused and bridged ring dienes such as tetrahydroindene; methyltetrahydroindene; dicyclopentadiene; bicyclo (2,2,1) hepta 2,5-diene, alkenyl, alkylidene, cycloalkenyl and cycloalkylidene norbornenes such as 5-methylene-2-norbornene (MNB), 5-ethylidene-2-norbornene (ENB), 5-propenyl-2-norbornene, 5-isopropylidene-2-norbornene, 5-(4-cyclopentenyl)-2-norbornene; 5-cyclohexylidene-2-norbornene, methylnorbornadiene.

The term "EPDM" as used in the specification and claims is used in the sense of its definition as found in ASTM D-1418-64 and is intended to mean terpolymers containing ethylene and propylene in the backbone and a diene in a side chain which results in an olefin. Illustrative methods for producing these terpolymers are found in U.S. Pat. No. 3,280,082, British Patent 1,030,289 and French Pat. No. 1,386,600, incorporated herein by reference. The preferred polymers contain about .1 to about 20 weight percent of diene monomer, the balance of the polymer being ethylene and propylene. Preferably, the polymer contains about 1.0 to about 15 weight percent diene monomer, e.g., 3.3 weight percent. The diene monomer is a nonconjugated diene. The preferred nonconjugated diene monomers which may be used in the preparation of the terpolymer of this invention (EPDM) are hexadiene, dicyclopentadiene, ethylidene norbornene, methylene norbornene, propylidene norbornene and methyltetrahydroindene.

Formation of the novel copolymer of this invention may be effected by forming a mixture of the monomer components containing the following components by weight, these being per 100 parts by weight of diluent:

| Component | Broad Range | Preferred Range | Typical |
|---|---|---|---|
| Ethylene | 0.1–10.0 | 1.0–6.0 | 2.5 |
| Higher Alpha Olefin | 0.1–20.0 | 1.0–12.0 | 6.2 |
| Diolefin | 0.0–1.0 | 0.0–0.6 | 0.17 |

Mixtures of these monomers may be used, i.e. more than one alpha olefin and/or more than one diolefin may be employed. It will be noted that when only ethylene and higher alpha olefin are present, the product may be a 2-component polymer; when the diolefin is present, the copolymer is a terpolymer. Other compatible components, including those which are copolymerizable to form tetrapolymers, may be present.

The diluents suitable for use in the practice of this invention are the non-reactive hydrocarbon solvents or the propylene monomer itself. The hydrocarbon solvent may be aromatic, alicyclic or acyclic hydrocarbons or chlorinated hydrocarbons. The preferred hydrocarbon diluents are the aliphatic hydrocarbons, for example pentane, hexane, heptane, etc. The aromatic hydrocarbons useful in the practice of this invention include benzene and its derivatives. Illustrative of such aromatic diluents are benzene, toluene, xylene, ethyl benzene, mesitylene, etc. Illustrative of the cyclic hydrocarbons useful as diluents are cyclohexane and its derivatives. The chlorinated hydrocarbons may be tetrachloroethylene, carbon tetrachloride, dichloroethane, chlorobenzene, etc. In carrying out the process of this invention, the catalyst system may be introduced into the reaction medium neat or in a solvent, preferably a hydrocarbon solvent. The term "non-reactive" as used in the specification and claims means hydrocarbons substantially free of olefinic unsaturation.

The concentration of the catalyst system is not critical and dilution of the catalyst system is purely for the convenience of metering. In large scale commercial operations where the quantities of catalyst system introduced into the system are sufficient, no dilution is necessary as they may be readily metered in the neat form. The solvents suitable for use as catalyst solvents are the aforementioned diluents used as part of the reaction medium.

The catalyst system of this invention comprises vanadium tetrachloride in conjunction with a cocatalyst comprising alkyl aluminum dichloride, in conjunction with an equimolar ratio of tri-isobutyl aluminum. The alkyl aluminum dichloride is ethyl aluminum dichloride or isobutyl aluminum dichloride, preferably ethyl aluminum dichloride. The more critical aspects of this invention comprise the use of vanadium tetrachloride and tri-isobutyl aluminum in conjunction with ethyl aluminum dichloride. Other halides of vanadium are inoperative. Other trialkyl aluminum compounds are likewise inoperative. Optimum results are achieved when equimolar quantities of ethyl aluminum dichloride and tri-isobutyl aluminum are used.

The relative amounts of the catalyst and the cocatalyst in the catalytic mixture used in the process may be such that the molar ratio of aluminum compound to the $VCl_4$ may be 0.5–50, more preferably 2–20, and most preferably 8. Polymerization is effected by passing 0.1 to 10 parts of ethylene, 0.1 to 20 parts of higher alpha olefin and 0 to 1.0 parts of diolefin third monomer into 100 parts of a liquid inert solvent diluent reaction medium containing 0.0005 to 0.05 parts catalyst and 0.001 to 0.20 parts of cocatalyst per 100 parts of reaction medium. More preferably 3.2 parts of ethylene, 2,4 parts of alpha olefin such as propylene, 0.24 parts of diolefin third monomer such as 5-ethylidene-2-norbornene, ENB, 0.007 parts of catalyst and 0.046 parts of cocatalyst are used. All steps in this reaction should be carried out in the absence of moisture, carbon dioxide or other harmful materials. Preferably, all reactants and catalysts should be pure and dry and blanketed with inert gas such as nitrogen or argon.

In the preferred embodiment, the nonreactive reaction medium may be the same as the hydrocarbon solvent in which the catalyst mixture has been formed. If not the same material, it will preferably be one which is compatible, e.g. totally miscible with the reaction medium.

In the preferred embodiment, the polymerization reaction is carried out by separately feeding to the polymerization step the charge mixture of ethylene and higher alpha olefin together with diolefin, when used, the cocatalyst, and the hydrocarbon solvent containing the catalyst. During polymerization, the reaction mixture is agitated and maintained at temperatures of −40°C. to 200°C., more preferably −10°C. to 100°C., and most preferably about 30°C. and pressures of 0–1000 psig, more preferably 0–600 psig, and most preferably 60 psig, for a period of 1–300 minutes, more preferably 3–60 minutes, and most preferably 14 minutes.

At the end of this period, polymerization should be completed. The catalyst is deactivated by the addition of an alcohol such as isopropanol or butanol. The mixture is deashed by mixing with aqueous hydrochloric acid; and the organic layer is separated and stripped to yield a residue of copolymer. The copolymer is obtained in an amount of 1–10 parts, say 5 parts corresponding to 90 to 98%, say 90% yield based on ethylene.

The polymer of this invention may contain two components or three components. When it is a two-component copolymer, preferably the ethylene component may be present in amounts of 20–85 parts, more preferably 50–80 parts, and most preferably 70 parts, and the higher alpha olefin, preferably propylene, may be present in amounts of 15–80 parts, more preferably 20–50 parts, and most preferably 30 parts. When the polymer is a terpolymer, the ethylene component may be present in amounts of 20–85 parts, more preferably 50–80 parts, and most preferably 65 parts, the higher alpha olefin component may be present in amounts of 15–80 parts, more preferably 20–50 parts, and most preferably 30 parts, and the third component, typically 5-ethylidene-2-norbornene, may be present in amounts of 0–25 parts, more preferably 0.5–15 parts, and most preferably 5 parts. Other copolymerized monomers may also be present including butene-1, etc. The product typically has a number average molecular weight $M_n$ of 50,000 − 200,000 as determined by osmometry.

The tensile strength of the product is found to be from about 12% to about 25% above typical comparable prior art values.

It is a particular feature of the product of this invention that it be formulated and compounded to produce a product unexpectedly characterized by low compression set and high tensile strength.

The product may readily be blended with a variety of oils, carbon blacks, clays and silicas. Typical carbon blacks may include those commercially available under the designations SAF, SRF, HAF, FEF, and MPC. The carbon black in amounts of 0–500 or more, preferably 0–200 parts by weight, may be blended with 100 parts of polymer; and 0–200 parts of oil may also be added.

An additional unusual feature of this invention is that the copolymer produced with the novel catalyst may be cured to high tensile strength even in the presence of carbon black filler having a large particle size. For example, tensile strength in excess of 2,000 psi may be obtained when the cured polymer contains 150–300 parts by weight of a coarse carbon black having an average particle size of 0.01 – 0.5 microns and 50 – 150 parts of an extender oil.

The novel products of this invention may be used in a wide variety of end uses. Typically, they may find use in molded, formed or coated products including sponges, tires and inner tubes, footwear, cable coatings, hoses and tubings, belts, etc.

DESCRIPTION OF THE PREFERRED EMBODIMENTS

Practice of this invention may be illustrated by the following examples. As elsewhere in this description, all parts are by weight unless otherwise indicated.

EXAMPLE 1

A reaction product of $VOCl_3$ and tetrabutyl titanate was formed specifically as follows: Equal weights of $VOCl_3$ and $Ti(O\text{-}Butyl)_4$ were dissolved in n-hexane to make a 1.0 g/100 ml. catalyst solution. $Et_2AlCl$ served as the cocatalyst (3.42 g. $Et_2AlCl$ in 100 ml. n-hexane). Both the catalyst and the cocatalyst were fed continuously to the reactor at a rate of 8.0—8.0 ml/min. Which results in a feed rate of 2.40 g/HR $VOCl_3$, 2.40 g/HR $Ti(O\text{-}Butyl)_4$ and 16.42 g/HR $Et_2AlCl$.

The polymerization was carried out by passing to the polymerization reaction vessel per 100 parts of diluent hexane, 3.2 parts of ethylene, 3.2 parts of propylene and 0.23 parts of 5-ethylidene-2-norbornene (ENB).

Reaction was conducted at 27°C. and 60 psig for an effective residence time of 13.5 minutes during which the reactants may be subjected to agitation. All reactants and vessels may be maintained pure, dry and anaerobic.

At the conclusion of a polymerization run, the products were removed from the reaction vessel and the catalyst deactivated by addition of 0.5 parts of isopropanol. The reaction mixture was mixed with diluted hydrochloric acid and the hydrocarbon layer separated. The diluent was stripped at 100°C. to yield product polymer.

EXAMPLE 2

In this example a catalyst solution may be prepared by mixing 0.50 g $VCl_4$ in 100 ml n-hexane. The cocatalyst solution consists of an equimolar mixture of triisobutyl aluminum (TIBA) and ethyl aluminum dichloride (EADC). Each 100 ml cocatalyst solution contains 1.80 g of TIBA and 1.15 g of EADC in n-hexane. The catalyst and the cocatalyst solutions were fed to the reactor continuously at a rate of 7.0 ml/min. and 7.75 ml/min., respectively. The $VCl_4$ feed rate was 2.10 g/HR and the cocatalyst feed rate was 8.36 g/HR TIBA and 5.35 g/HR EADC.

The polymerization is carried out by passing to the polymerization reactor per 100 parts of diluent hexane, 3.2 parts of ethylene, 2.4 parts of propylene, and 0.24 parts of 5-ethylidene-2-norbornene.

Reaction was carried out at 32°C. and 60 psig for an effective residence time of 13.5 minutes during which the reactants were subjected to agitation. All reactants and vessels should be maintained pure, dry and anaerobic.

The product may be analyzed and the analyses are set forth in Tables I and III together with the significant process conditions.

The specific process conditions set forth in the various tables include the following:

1. Al/V — The molar ratio of the aluminum cocatalyst to the vanadium catalyst (Table I).
2. Efficiency — The catalyst efficiency in terms of pounds of polymer produced per pound of $VCl_4$ (Table II).
3. Conversion — The percent of ethylene and separately the percent of propylene admitted to the reaction vessel which was converted to polymer product (Table I).
4. $C_2$ Composition — The weight percent of ethylene in the polymer composition determined by infrared spectroscopy (Tables I and III).
5. I.V. — The inherent viscosity of the polymer product determined in decalin at 135°C. by standard methods (Table III).
6. $M_L$ — The Mooney Viscosity at 260°F. determined by using a large No. 1 rotor for a period of 8 minutes (Table III).

Table 1

|  | Example 1 (control) | Example 2 |
|---|---|---|
| Temp., °C. | 27 | 32 |
| Res. Time, Min. | 13.5 | 13.5 |
| Feeds Lbs./100 Lbs. C_6 | | |
| Ethylene | 3.20 | 3.20 |
| Propylene | 3.20 | 2.40 |
| Diene | .23 | .24 |
| Catalyst | .008 | .007 |
| Al/V Molar Ratio | 6.5 | 7.75 |
| H_2 Feed PPM | — | — |
| Rate of Copolymer g/hr. | — | — |
| Cat. Eff. Lbs./Lbs. V | 515 | 659 |
| Conversion | | |
| C_2 Wt. % | 82 | 90 |
| C_3 Wt. % | 41 | 64 |
| ENB Wt. % | 79 | 87 |
| Polymer Composition | | |
| C_2 Wt. % | 66.4 | 65.3 |
| ENB Wt. % | 4.4 | 4.5 |
| Inherent Viscosity | 3.3 | 2.5 |
| Mooney Viscosity | | |
| 260°F. 1+8' | 54 | 65 |
| $\bar{M}_n \times 10^{-3}$ | ~60 | 93 |

The product of Example 2 which is typical of the polymer composition prepared in accordance with the process of this invention and a control run (Example 1) were each separately compounded by mixing same with the following formulations:

Table II

|  | Parts |
|---|---|
| Polymer | 100 |
| FEF Carbon Black | 80 |
| SRF Carbon Black | 80 |
| Flexon 886 Blend of Extender Oil | 100 |
| Stearic Acid | 1 |
| Zinc Oxide | 5 |
| TMTDS (Tetramethyl Thiuramdisulfide) | 1.5 |
| MBT (MercaptoBenzothiazole) | 0.5 |

Table II-continued

| | Parts |
|---|---|
| Sulfur | 1.5 |

The so-mixed formulation may be blended in a Banbury mixer, then cured for 10 minutes at 320°F. The product of this invention (Example 2), when tested against the control (Example 1) are found to possess the properties as set forth in Table III as follows:

Table III

| | Example 1 (Control) | Example 2 |
|---|---|---|
| $M_L$ | 54 | 65 |
| Wt. % $C_2$ | 66.4 | 65.3 |
| Wt. % ENB | 4.4 | 4.5 |
| I.V. | 3.3 | 2.5 |
| Physical Properties | | |
| Tensile, psi | 1800 | 2100 |
| Elongation, % | 460 | 410 |
| 300% Modulus, psi | 1380 | 1660 |
| Compression Set (%)* | | |
| 22 hr. at 212°F. | 51 | 37 |

*Compression set buttons cured 25' at 320°F.

From Table III, it is apparent that the products of this invention are superior to those of the control prior art product. The product of this invention reveals a 17% increase in tensile strength and a 20% increase in 300% modulus as compared to the control prior art product. The product of this invention also surprisingly showed a lower compression set than the control prior art product while not losing either tensile strength or 300% modulus.

What is claimed is:
1. In a process for preparing a copolymer of ethylene, a higher alpha olefin and a nonconjugated diene, the improvement which comprises using a catalyst system comprising (1) $VCl_4$ as the catalyst and (2) a cocatalyst comprising an equimolar ratio of alkyl aluminum dichloride and tri-isobutyl aluminum wherein the alkyl aluminum dichloride is ethyl aluminum dichloride or isobutyl aluminum dichloride.
2. The process of claim 1 wherein the polymer is an EPDM, the higher alpha olefin is propylene and the alkyl aluminum dichloride is ethyl aluminum dichloride.
3. The process of claim 1 wherein the aluminum to vanadium molar ratio is about 2/1 to about 20/1.
4. The process of claim 3 wherein the aluminum to vanadium molar ratio is about 4/1 to about 10/1.
5. The process of claim 2 wherein the nonconjugated diene of the EPDM is 5-ethylidene-2-norbornene.
6. The process of claim 1 wherein the catalyst system is introduced into the reaction medium as a neat liquid.
7. The process of claim 1 wherein the catalyst system is introduced into the reaction medium in solution.
8. The process of claim 7 wherein the catalyst solvent is a hydrocarbon solvent.
9. The process of claim 8 wherein the hydrocarbon solvent is hexane.
10. The process of claim 1 wherein the reaction is carried out using as a diluent a solvent selected from the group consisting of hydrocarbon solvents and chlorinated hydrocarbon solvents.
11. The process of claim 10 wherein the diluent is hexane.

* * * * *